(12) United States Patent
Agiwal et al.

(10) Patent No.: US 11,191,080 B2
(45) Date of Patent: Nov. 30, 2021

(54) SYSTEM AND METHOD OF SYSTEM INFORMATION REQUEST IN A CELL SUPPORTING MULTIPLE UPLINK CARRIERS

(71) Applicant: SAMSUNG ELECTRONICS CO., LTD., Suwon-si (KR)

(72) Inventors: Anil Agiwal, Suwon-si (KR); Jaehyuk Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 16/698,321

(22) Filed: Nov. 27, 2019

(65) Prior Publication Data

US 2020/0170020 A1 May 28, 2020

Related U.S. Application Data

(60) Provisional application No. 62/771,812, filed on Nov. 27, 2018.

(51) Int. Cl.
*H04W 72/04* (2009.01)
*H04W 74/08* (2009.01)
(Continued)

(52) U.S. Cl.
CPC ....... *H04W 72/0493* (2013.01); *H04L 5/0055* (2013.01); *H04W 24/08* (2013.01);
(Continued)

(58) Field of Classification Search
CPC . H04W 72/0493; H04W 76/27; H04W 24/08; H04W 24/10; H04W 72/0413; H04W 74/0833; H04L 5/0055
See application file for complete search history.

(56) References Cited

U.S. PATENT DOCUMENTS 10,945,290 B2 * 3/2021 Jeon .................. H04W 74/0833
2011/0075629 A1 3/2011 Seo et al.
(Continued)

FOREIGN PATENT DOCUMENTS

KR 1020100049487 A 5/2010
WO 2017218282 A1 12/2017

OTHER PUBLICATIONS

International Search Report dated Mar. 4, 2020 issued by the International Searching Authority in International Application No. PCT/KR2019/016444.
(Continued)

*Primary Examiner* — Michael J Moore, Jr.
(74) *Attorney, Agent, or Firm* — Sughrue Mion, PLLC

(57) ABSTRACT

A communication method and system for converging a 5th-Generation (5G) communication system for supporting higher data rates beyond a 4th-Generation (4G) system with a technology for Internet of Things (IoT). The method and system may be applied to intelligent services based on the 5G communication technology and the IoT-related technology, such as smart home, smart building, smart city, smart car, connected car, health care, digital education, smart retail, security and safety services in an a system information (SI) transmission in a cell supporting multiple uplink (UL) carriers.

16 Claims, 13 Drawing Sheets

(51) Int. Cl.
*H04W 24/08* (2009.01)
*H04W 76/27* (2018.01)
*H04W 24/10* (2009.01)
*H04L 5/00* (2006.01)

(52) U.S. Cl.
CPC ....... *H04W 24/10* (2013.01); *H04W 72/0413* (2013.01); *H04W 74/0833* (2013.01); *H04W 76/27* (2018.02)

(56) References Cited

U.S. PATENT DOCUMENTS

| | | | |
|---|---|---|---|
| 2018/0220288 A1 | 8/2018 | Agiwal et al. | |
| 2019/0215749 A1* | 7/2019 | Shih | H04W 36/18 |
| 2019/0306890 A1* | 10/2019 | Jang | H04W 74/0833 |
| 2020/0008240 A1* | 1/2020 | Golitschek Edler von Elbwart | H04W 72/042 |
| 2020/0053799 A1* | 2/2020 | Jeon | H04W 74/0833 |
| 2020/0146069 A1* | 5/2020 | Chen | H04W 52/362 |
| 2020/0296639 A1* | 9/2020 | Agiwal | H04B 17/327 |
| 2020/0351950 A1* | 11/2020 | Liu | H04W 72/0453 |
| 2021/0153253 A1* | 5/2021 | Wang | H04W 74/0833 |

OTHER PUBLICATIONS

Written Opinion dated Mar. 4, 2020 issued by the International Searching Authority in International Application No. PCT/KR2019/016444.

ZTE Corporation, et al., "CR on SI request procedure in TS38.331", R2-1814029, 3 GPP TSG-RAN WG2 Meeting #103bis, Oct. 8-12, Sep. 27, 2018, pp. 1-9.

3GPP TS 38.321, V15.3.0 (Sep. 2018), 3rd Generation Partnership Project; Technical Specification Group Radio Access Network; NR; Medium Access Control (MAC) protocol specification (Release 15), Sep. 25, 2018, pp. 1-78.

CMCC, "Discussion on SUL and UL sharing band definition", R4-1706706, 3GPP TSG-RAN WG4 Meeting NR#2, May 27-29, 2017, Jun. 19, 2017, 5 pages.

* cited by examiner

SYSTEM AND METHOD OF SYSTEM INFORMATION REQUEST IN A CELL SUPPORTING MULTIPLE UPLINK CARRIERS

CROSS-REFERENCE TO RELATED APPLICATION(S)

This application claims the benefit of U.S. Provisional Patent Application No. 62/771,812 filed in the U.S. Patent and Trademark Office on Nov. 27, 2018, the disclosure of which is herein incorporated by reference in its entirety.

1. FIELD

The disclosure relates to a wireless communication system. More specifically, the disclosure relates to an apparatus, a method, and a system for a system information (SI) request in a cell supporting multiple uplink carriers in wireless communication system.

2. DESCRIPTION OF RELATED ART

Demand for wireless data traffic has increased since deployment of fourth generation (4G) communication systems. Continuing efforts have been made to develop an improved fifth generation (5G) or pre-5G communication system, which may be referred to as a 'Beyond 4G Network' or a 'Post LTE System.'

In general, a 5G communication system is considered to be implemented in higher frequency (mmWave) bands, e.g., 60 GHz bands, to accomplish higher data rates. To decrease propagation loss of the radio waves and increase transmission distance, beamforming, massive multiple-input multiple-output (MIMO), Full Dimensional MIMO (FD-MIMO), array antenna, an analog beam forming, and large scale antenna techniques have been proposed in 5G communication systems. In addition, in 5G communication systems, development for system network improvement is under consideration based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network in which humans generate and consume information, is now evolving to the Internet of Things (IoT) in which distributed entities, such as devices, exchange and process information without human intervention. The Internet of Everything (IoE), which is a combination of IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been additionally researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In view of the above, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance a system information (SI) request procedure in next generation wireless communication systems.

SUMMARY

Aspects of the disclosure may address at least the above-mentioned problems and/or disadvantages and provide at least the advantages described below. Accordingly, an aspect of the disclosure is to provide a communication method and system for converging a fifth generation (5G) communication system for supporting higher data rates beyond a fourth generation (4G) communication system.

In accordance with an aspect of the disclosure, there is provided a method performed by a terminal including: transmitting, on a supplementary uplink (SUL) to a base station, a preamble of a random access procedure to request a system information (SI) based on a first SI request configuration for the SUL, if it is determined that a system information block 1 (SIB1) received from the base station includes the first SI request configuration for the SUL and a first criteria to select the SUL is met; and transmitting, on a normal uplink (NUL) to the base station, the preamble of the random access procedure to request the SI based on a second SI request configuration for the NUL, if it is determined that the SIB1 includes the second SI request configuration for the NUL and a second criteria to select the NUL is met.

In accordance with an aspect of the disclosure, there is provided a method of performed by a base station including: receiving, on a supplementary uplink (SUL) from a terminal, a preamble of a random access procedure to request a system information (SI) based on a first SI request configuration for the SUL, based on the terminal determining that a system information block 1 (SIB1) transmitted to the terminal includes the first SI request configuration for the SUL and a first criteria to select the SUL is met; and receiving, on a normal uplink (NUL) from the terminal, the preamble of the random access procedure to request the SI based on a second SI request configuration for the NUL, if it is determined that the SIB1 includes the second SI request configuration for the NUL and a second criteria to select the NUL is met.

In accordance with an aspect of the disclosure, there is provided a terminal including: a transceiver configured to transmit and receive a signal; and a controller configured to control the transceiver to: transmit, on a supplementary uplink (SUL) to a base station, a preamble of a random access procedure to request a system information (SI) based on a first SI request configuration for the SUL, if it is determined that a system information block 1 (SIB1) received from the base station includes the first SI request configuration for the SUL and a first criteria to select the SUL is met, and transmit, on a normal uplink (NUL) to the base station, the preamble of the random access procedure to request the SI based on a second SI request configuration for the NUL, if it is determined that the SIB1 includes the second SI request configuration for the NUL and a second criteria to select the NUL is met.

In accordance with another aspect of the disclosure, there is provided a base station including: a transceiver configured to transmit and receive a signal; and a controller configured to control the transceiver to: receive, on a supplementary uplink (SUL) from a terminal, a preamble of a random access procedure to request a system information (SI) based on a first SI request configuration for the SUL, if it is determined that a system information block 1 (SIB1) transmitted to the terminal includes the first SI request configuration for the SUL and a first criteria to select the SUL is met, and receive, on a normal uplink (NUL) from the terminal, the preamble of the random access procedure to request the SI based on a second SI request configuration for the NUL, if it is determined that the SIB1 includes the second SI request configuration for the NUL and a second criteria to select the NUL is met.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
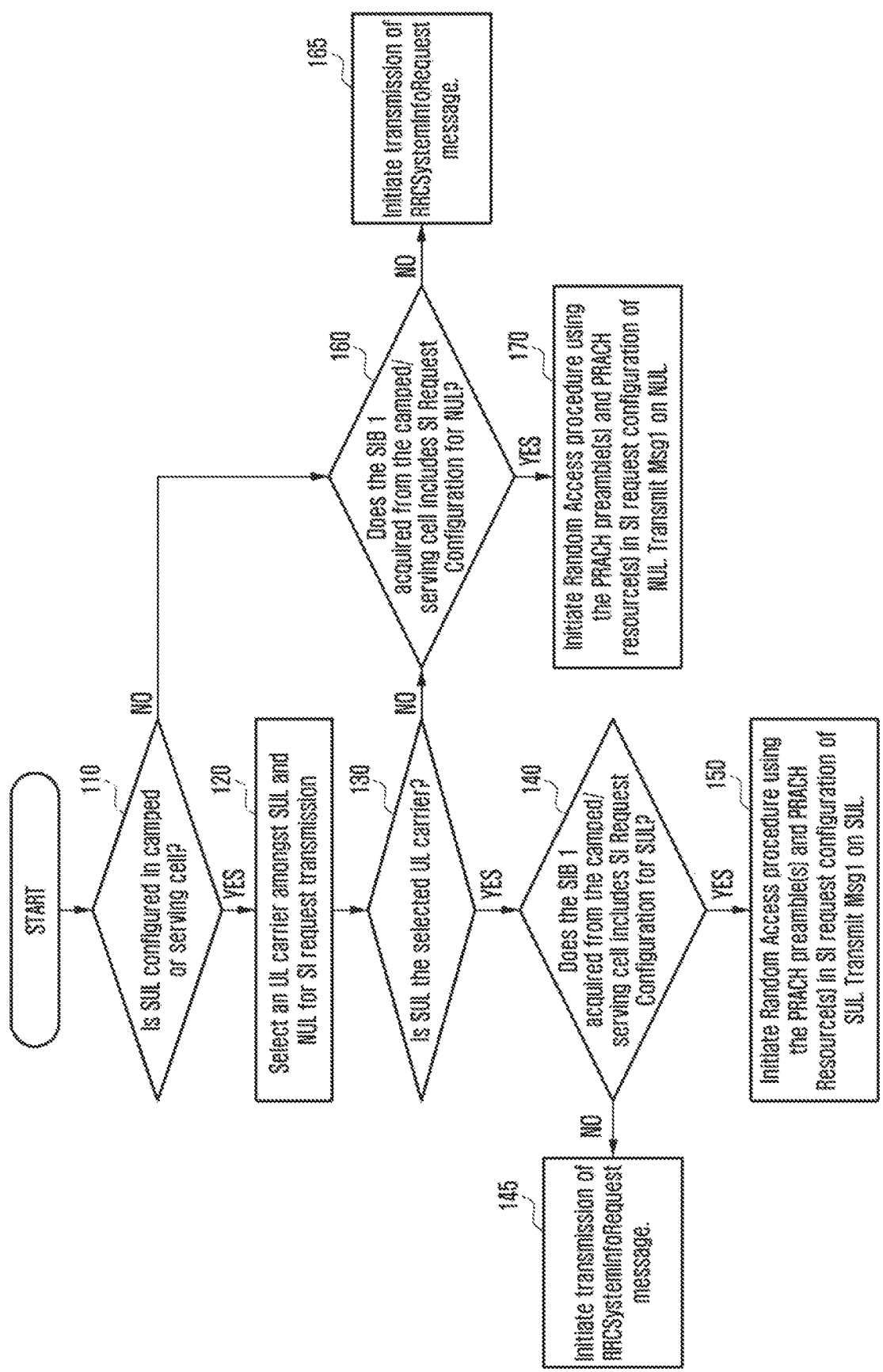
FIG. 1 illustrates a flowchart of a method of an SI request transmission procedure of a terminal and a base station according to an embodiment of the disclosure.

The following description with reference to the accompanying drawings is provided to assist in a comprehensive understanding of various embodiments of the disclosure as defined by the claims and their equivalents. The description includes various specific details to assist in that understanding, but the embodiments are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely selected to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is understood to those skilled in the art that blocks of a flowchart (or sequence diagram) and a combination of flowcharts may be represented and executed by computer program instructions. These computer program instructions may be loaded from memory and executed by a processor of a general purpose computer, special purpose computer, or programmable data processing equipment. When the loaded program instructions are executed by the processor, the program instructions provide for implementation carrying out functions described in the flowchart. Because the computer program instructions may be stored in a computer readable memory that is usable in a specialized computer or a programmable data processing equipment, articles of manufacture that carry out functions described in the flowchart may also be employed. Because the computer program instructions may be loaded on a computer or a programmable data processing equipment, when executed as processes, the computer or other programmable processing equipment may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured to reside in an addressable storage medium to be executed by one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions to aid in understanding the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (SGNB), or gNB.

The "UE" is an entity communicating with a BS and may be referred to as UE, device, mobile station (MS), mobile equipment (ME), or terminal.

In the recent years several broadband wireless technologies have been developed to meet the growing base of broadband subscribers and to provide increased and improved applications and services. The second generation (2G) wireless communication system has been developed to provide voice services while ensuring the mobility of users. Third generation (3G) wireless communication system support both voice service and also data service. In recent years, the 4G wireless communication system has been developed to provide high-speed data service. However, currently, the 4G wireless communication system suffers from lack of resources to meet the further growing demands for high speed data services. And so, fifth generation (5G) wireless communication systems are being developed to meet the growing demand for high speed data services, supporting ultra-reliability and low latency applications.

The 5th generation wireless communication system will be implemented not only in lower frequency bands, but also in higher frequency (mmWave) bands, e.g., 10 GHz to 100 GHz bands, to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the $5^{th}$ generation wireless communication system is expected to address different use cases having quite different requirements in terms of data rate, latency, reliability, mobility etc. However, the design of the air-interface of the 5th generation wireless communication system is expected to be sufficiently flexible to service the various UEs having quite different capabilities depending on the use case and market segment of the end customer. Few example, a use case of the 5th generation wireless communication system wireless system is expected to address enhanced Mobile Broadband (eMBB), massive Machine Type Communication (m-MTC), ultra-reliable low latency communication (URLLC) etc. The eMBB requirements, like tens of Gbps data rate, low latency, high mobility, etc. address the market segment representing the conventional wireless broadband subscribers needing Internet connectivity everywhere, all the time, and on the go. The m-MTC requirements like very high connection density, infrequent data transmission, very long battery life, low mobility address, etc. address the market segment representing the Internet of Things (IoT)/Internet of Everything (IoE) envisioning connectivity of billions of devices. The URLLC requirements like very low latency, very high reliability and variable mobility, etc. address the market segment representing the Industrial automation application, vehicle-to-vehicle/vehicle-to-infrastructure communication foreseen as one of the prerequisites necessary for autonomous cars.

In the 4th generation wireless communication system, an enhanced node B (eNB) or a base station in a cell broadcasts system information. System information is structured into a master information block (MIB) and a set of system information blocks (SIBs). The MIB consists of System Frame Number (SFN), Downlink System bandwidth and Physical Hybrid ARQ Feedback Indicator Channel (PHICH) configuration. The MIB is transmitted every 40 ms. Transmission of the MIB may be repeated every 10 ms, and the first transmission may occur in subframe #0 when SFM mod 4 equals zero. The MIB is transmitted on physical broadcast channel. System Information Block Type 1 carries cell identity, tracking area code, cell barring information, value tag (common for all scheduling units), and scheduling information of other SIBs. The SIB 1 is transmitted every 80 ms in subframe #5 when SFN mod 8 equals zero. The SIB 1 is repeated in subframe #5 when SFN mod 2 equals zero. The SIB 1 is transmitted on Physical downlink shared channel. Other SIBs (SIB 2 to SIB 19) are transmitted in System Information (SI) message in which scheduling info of these SIBs are indicated in SIB 1.

A UE acquires the system information at cell selection, cell reselection, after handover completion, after entering E-UTRA from another Radio Access Technology (RAT), upon re-entering service area, upon receiving a notification (paging), and upon exceeding the maximum validity duration (e.g., 3 hours). In the Radio Resource Control (RRC) idle and inactive state, the UE needs to acquire MIB, SIB 1, SIB 2 to SIB 5, SIB 6 to SIB 8 (depending on RAT supported), SIB 17 (if LTE and Wireless Local Area Network interworking (LTE-WLAN IWK) is supported), and SIB 18 to SIB 19 (if Device to Device (D2D) is supported). In the RRC connected state, the UE needs to acquire MIB, SIB 1, SIB 2, SIB 8 (depending on RAT supported), SIB 17 (if LTE-WLAN IWK is supported), and SIB 18 to SIB 19 (if D2D is supported).

In the $5^{th}$ generation wireless communication system (also referred as next generation radio or New Radio (NR)), System Information (SI) is divided into the MIB and a number of SIBs where:

the SI may be divided into the MIB and a number of SIBs in the configuration the MIB is always transmitted on the Broadcast Channel (BCH) with a periodicity of 80 ms and repetitions made within 80 ms and includes parameters that are needed to acquire SIB1 from the cell.

the SI may be divided into the MIB and a number of SIBs in the configuration the SIB1 is transmitted on the Downlink Shared Channel (DL-SCH) with a periodicity of 160 ms and variable transmission repetition. The default transmission repetition periodicity of SIB1 is 20 ms, but the actual transmission repetition periodicity is up to network implementation. The scheduling information in SIB 1 includes a mapping between SIBs and SI messages, periodicity of each SI message, and SI window length. The scheduling information in SIB 1 includes an indicator for each SI message, which indicates whether the concerned SI message is being broadcasted. If at least one SI message is not being broadcasted, SIB1 may include random access resources (Physical Random Access Channel (PRACH) preamble(s) and PRACH resource(s)) for requesting gNB to broadcast one or more SI message(s).

The SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with an SI-window, and the SI-windows of different SI messages do not overlap. That is, within one SI-window, only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

If the UE requires an SI message to operate in cell and that SI message is not being broadcasted the UE shall:

If SIB1 includes include random access resources (PRACH preamble(s) and PRACH resource(s)) for requesting SI, the UE initiates the Random Access procedure using the PRACH preamble(s) and PRACH resource(s) corresponding to the SI message. The UE transmits Msg1 (i.e. Random access preamble) and waits for acknowledgement for SI request. If acknowledgement for the SI request is received, the UE monitors the SI window of the requested SI message in one or more SI period(s) of that SI message. This method of SI request is also referred as Msg1 based SI request.

If SIB1 does not include random access resources (PRACH preamble(s) and PRACH resource(s)) for requesting SI, the UE initiates transmission of RRCSystemInfoRequest message. This procedure will trigger a random access procedure in which the UE transmits Msg1 (i.e. Random access preamble) and waits for the random access response. According to the UL grant received in random access response, the UE transmits RRCSystemInfoRequest message and waits for acknowledgement for SI request (i.e., RRCSystemInfoRequest message). If acknowledgement for SI request (i.e., RRCSystemInfoRequest message) is received, the UE monitors the SI window of the requested SI message in one or more SI period(s) of that SI message. This method of SI request is also referred as Msg3 based SI request.

In NR, multiple UL carriers (referred a normal uplink carrier (NUL) and supplementary uplink carrier (SUL)) can be supported in a serving cell. In case the supplementary uplink carrier is configured in addition to the normal uplink carrier in a serving cell, the following SI request configurations in SIB 1 are possible:

Configuration 1: SI request random access resources (PRACH preamble(s) and PRACH occasion(s)) are configured in the supplementary uplink carrier, but not configured for the normal uplink carrier;

Configuration 2: SI request random access resources (PRACH preamble(s) and PRACH occasion(s)) are configured in the normal uplink carrier, but not configured for the supplementary uplink carrier;

Configuration 3: SI request random access resources (PRACH preamble(s) and PRACH occasion(s)) are configured for both the supplementary uplink carrier and the normal uplink carrier; and Configuration 4: SI request random access resources (PRACH preamble(s) and PRACH occasion(s)) are not configured for both the supplementary uplink carrier and the normal uplink carrier.

The current design addresses Configuration 2 and Configuration 4, in which the Msg1 based SI request is selected by UE for Configuration 2 and Msg3 based SI request is selected by the UE for Configuration 4. When SUL is configured, configuration 1 and configuration 3 also needed to be addressed. A method is needed to address selection of Msg1 vs. Msg3 based SI request when SUL is configured in addition to NUL in a serving cell.

Embodiment 1—SI Request Transmission: SUL Aspects

Embodiment 1-1

FIG. 1 illustrates a flowchart of a method of an SI request transmission procedure of a terminal and a base station according to an embodiment of the disclosure.

In accordance with an embodiment of FIG. 1, the UE operation is as follows.

The UE acquires SIB 1 from a camped cell or a serving cell. The UE checks the BroadcastStatus bit in SIB 1 for the SI message the UE needs to acquire.

If the SI message the UE needs to acquire is not being broadcasted (i.e. BroadcastStatus is set to zero), the UE initiates transmission of SI request. The procedure for SI request transmission is as follows.

1. UE determines whether supplementary uplink carrier (SUL) is configured or not in camped or serving cell (110). If the acquired SIB1 includes common uplink configuration for SUL, the UE determines that SUL is configured in serving cell. Common uplink configuration for SUL is indicated by supplementaryUplink field in ServingCellConfigCommonSIB information element of SIB 1.

2. If SUL is configured in camped or serving cell:
UE selects an UL carrier amongst normal uplink carrier (NUL) and SUL for SI request transmission (120). Either NUL or SUL is selected by the UE as followings (130):
SUL is the selected UL carrier for SI request, if Reference Signal Received Power (RSRP) derived from Synchronization Signal Block (SSB) measurements of camped or serving cell <rsrp-ThresholdSSB-SUL, where rsrp-ThresholdSSB-SUL is signaled by gNB (e.g. in broadcast signaling such as SIB1).
NUL is the selected UL carrier for SI request, if RSRP derived from SSB measurements of camped or serving cell >=rsrp-ThresholdSSB-SUL, where rsrp-ThresholdSSB-SUL is signaled by gNB (e.g. in broadcast signaling such as SIB1).
If SI request configuration is signaled by gNB for selected UL carrier, UE initiate transmission of SI request based on Msg1 based SI request on selected UL carrier (140, 150, 160, 170). SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-Request-Config in SIB1. If the IE si-RequestConfig is not present in SIB1, UE considers that SI request configuration for NUL is not signaled by gNB. In other words, UE initiates Random Access procedure using the PRACH preamble(s) and PRACH resource(s) in SI request configuration of selected UL carrier.

UE transmits Msg1 (i.e. Random access preamble) and waits for acknowledgement for SI request. Random access resources (PRACH preamble(s) and PRACH occasions(s)) indicated in SI request configuration of selected UL carrier is used for Msg1. Msg1 is transmitted on selected UL carrier. If acknowledgement for SI request is received, UE monitors the SI window of the requested SI message in one or more SI period(s) of that SI message.

If SI request configuration is not signaled by gNB for selected UL carrier, UE initiate transmission of SI request based on Msg3 based SI request on selected UL carrier. In other words, UE initiate transmission of RRCSystemInfoRequest message (140, 145, 160, 165).

UE transmits Msg1 (i.e. Random access preamble) and waits for random access response. Common random access resources (PRACH preamble(s) and PRACH occasions(s)) of selected UL carrier are used for Msg1. Msg1 is transmitted on selected UL carrier. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

3. Else if SUL is not configured in camped or serving cell (110):

If SI request configuration is signaled by gNB for NUL, UE initiate transmission of SI request based on Msg1 based SI request. In other words, UE initiates Random Access procedure using the PRACH preamble(s) and PRACH resource(s) in SI request configuration for NUL (160, 170).

UE transmits Msg1 (i.e. Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

If SI request configuration is not signaled by gNB for NUL, UE initiate transmission of SI request based on Msg3 based SI request. In other words, UE initiate transmission of RRCSystemInfoRequest message (160, 165).

UE transmits Msg1 (i.e. Random access preamble) and waits for random access response. Common random access resources (PRACH preamble(s) and PRACH occasions(s)) of NUL are used for Msg1. Msg1 is transmitted on NUL. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

In one embodiment of the above method, 'RSRP derived from SSB measurements of camped or serving cell' is determined as follows:

1> if nrofSS-BlocksToAverage is not configured in camped or serving cell; or
1> if absThreshSS-BlocksConsolidation is not configured in camped or serving cell; or
1> if the SS-RSRP of SSB with highest SS-RSRP is below or equal to absThreshSS-BlocksConsolidation:
  2> RSRP is the SS-RSRP of SSB with highest SS-RSRP.
1> else:
  2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation may be signaled by gNB (e.g. in broadcast signaling such as SIB).

In another embodiment of the above method, RSRP derived from SSB measurements of camped or serving cell is determined as follows: RSRP is the SS-RSRP of SSB with highest SS-RSRP.

Embodiment 1-2

Figure 2:
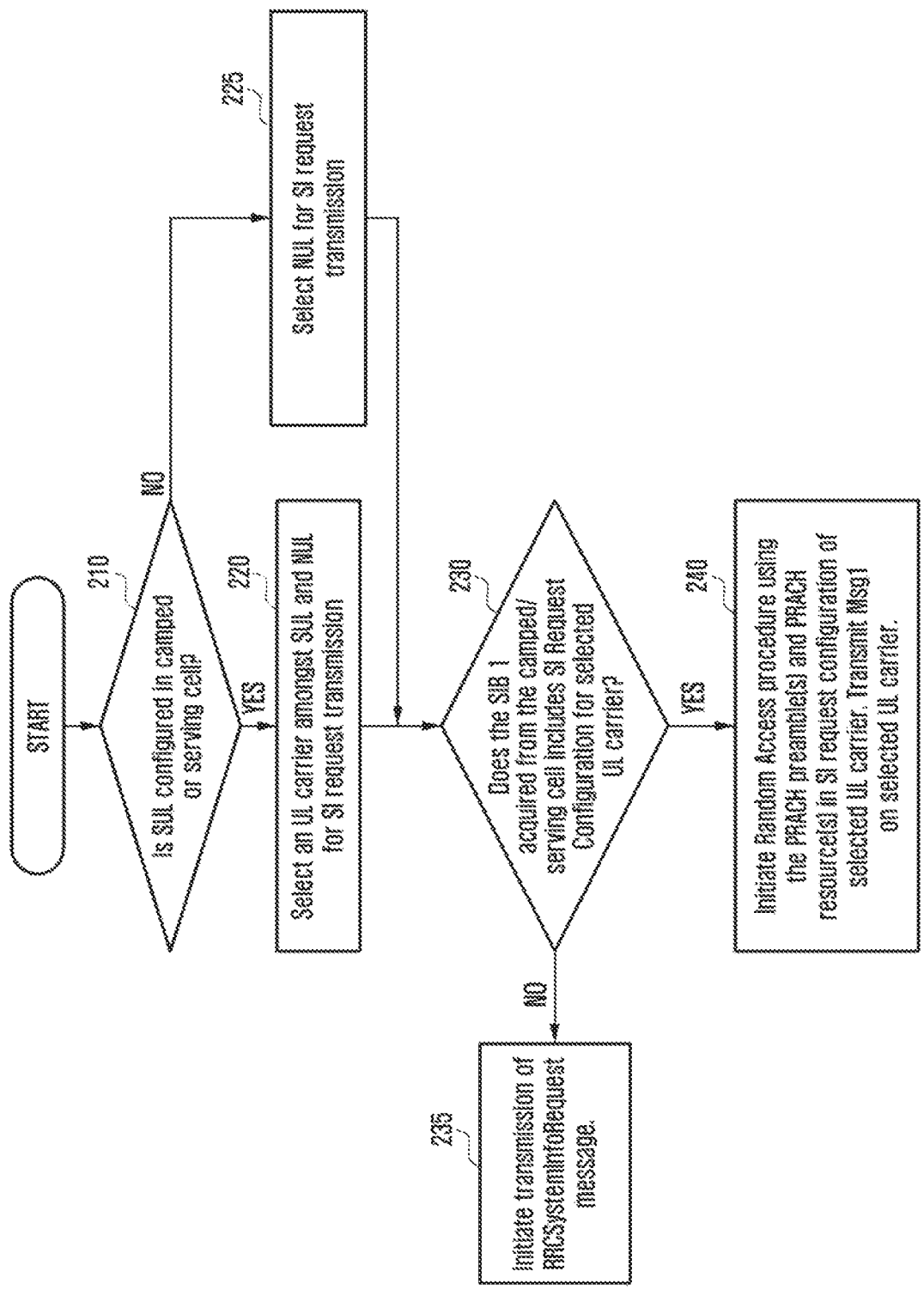
FIG. 2 illustrates a flowchart of a method of an SI request transmission procedure of a terminal and a base station according to an embodiment of the disclosure.

FIG. 2 illustrates a flowchart of a method of an SI request transmission procedure of a terminal and a base station according to another embodiment of the disclosure.

In accordance with an embodiment of FIG. 2, the UE operation is as follows.

The UE acquires SIB 1 from a camped or a serving cell. UE check the BroadcastStatus bit in SIB 1 for the SI message the UE needs to acquire.

If the SI message the UE needs to acquire is not being broadcasted (i.e. BroadcastStatus bit is set to zero), the UE initiates transmission of SI request.

The procedure for SI request transmission is as follows.

1. UE determines whether supplementary uplink carrier (SUL) is configured or not in camped or serving cell (210). If the acquired SIB1 includes common uplink configuration for SUL, the UE determines that SUL is configured in serving cell. Common uplink configuration for SUL is indicated by supplementaryUplink field in ServingCellConfigCommonSIB information element of SIB 1.

2. If SUL is configured in camped or serving cell, UE selects an UL carrier amongst uplink carrier (NUL) and SUL for SI request transmission (220). NUL or SUL is selected by the UE as followings:

SUL is the UL carrier for SI request, if RSRP derived from SSB measurements of camped or serving cell <rsrp-ThresholdSSB-SUL where rsrp-ThresholdSSB-SUL is signaled by gNB (e.g. in broadcast signaling such as SIB1).

NUL is the UL carrier for SI request, if RSRP derived from SSB measurements of camped or serving cell >=rsrp-ThresholdSSB-SUL where rsrp-ThresholdSSB-SUL is signaled by gNB (e.g. in broadcast signaling such as SIB1).

3. If SUL is not configured in camped or serving cell, UE selects NUL for SI request transmission (210, 225).

4. UE determines whether SIB1 acquired from camped or serving cell includes SI request configuration or not for the selected UL carrier (230).

5. If SI request configuration is not included for the selected UL carrier:

UE initiate transmission of SI request based on Msg3 based SI request on selected UL carrier. In other words, UE initiate transmission of RRCSystemInfoRequest message on selected UL carrier (235).

UE transmits Msg1 (i.e. Random access preamble) and waits for random access response. Common random access resources (PRACH preamble(s) and PRACH occasions(s)) of selected UL carrier are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

6. If SI request configuration is included for the selected UL carrier,

UE initiate transmission of SI request based on Msg1 based SI request on selected UL carrier (240). In other words, UE initiates Random Access procedure using the PRACH preamble(s) and PRACH resource(s) in SI request configuration of selected UL carrier. UE transmits Msg1 (i.e. Random access preamble) and waits for acknowledgement for SI request. Random access resources (PRACH preamble(s) and PRACH occasions(s)) indicated in SI request configuration of the selected UL carrier is used for Msg1. Msg1 is transmitted on selected UL carrier. If acknowledgement for SI request is received, UE monitors the SI window of the requested SI message in one or more SI period(s) of that SI message.

In one embodiment of the above method, RSRP derived from SSB measurements of camped or serving cell is determined as follows:

1> if nrofSS-BlocksToAverage is not configured in camped or serving cell; or

1> if absThreshSS-BlocksConsolidation is not configured in camped or serving cell; or 1> if the SS-RSRP of SSB with highest SS-RSRP is below or equal to absThreshSS-BlocksConsolidation:

2> RSRP is the SS-RSRP of SSB with highest SS-RSRP.

1> else:

2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation are signaled by gNB (e.g., in broadcast signaling such as SIB).

In another embodiment, RSRP derived from SSB measurements of camped or serving cell are determined as follows: RSRP is the SS-RSRP of SSB with highest SS-RSRP.

Embodiment 1-3

Figure 3:
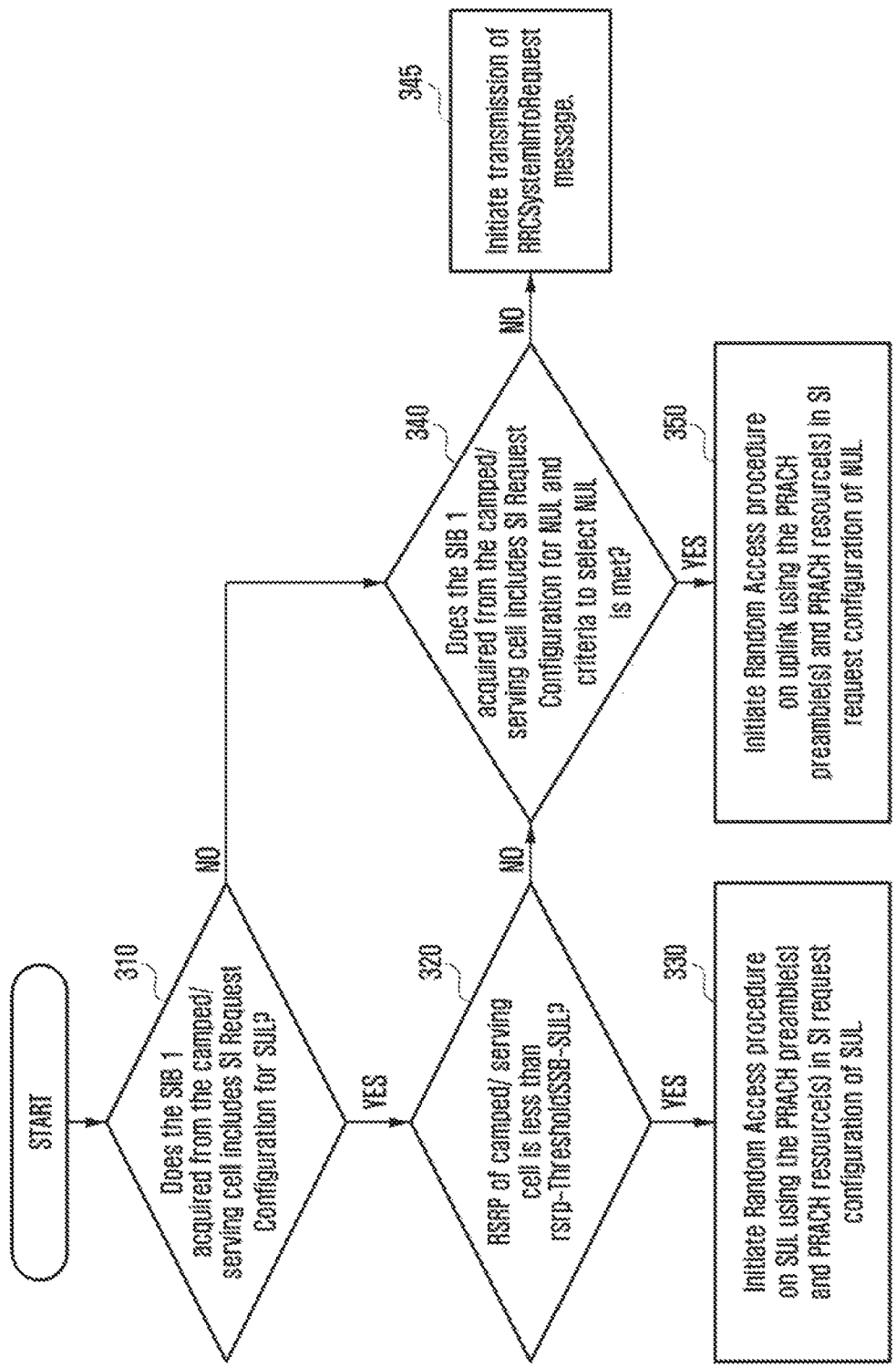
FIG. 3 illustrates a flowchart of a method of an SI request transmission procedure of a terminal and a base station according to an embodiment of the disclosure.

FIG. 3 illustrates a flowchart of a method of an SI request transmission procedure of a terminal and a base station according to an embodiment of the disclosure.

In accordance with an embodiment of FIG. 3, the UE operation is as follows.

The UE acquires SIB 1 from the camped or the serving cell. The UE may check the BroadcastStatus bit in SIB 1 for SI message the UE needs to acquire. SI request configuration for SUL is signaled by the gNB using the IE si-RequestConfigSUL in SIB1. If the IE si-RequestConfigSUL is not present in SIB1, the UE considers that SI request configuration for SUL is not signaled by gNB. The SI request configuration for NUL is signaled by gNB using the IE si-RequestConfig in SIB1. If the IE si-RequestConfig is not present in SIB1, the UE considers that SI request configuration for NUL is not signaled by gNB.

If the SI message the UE needs to acquire is not being broadcasted (i.e., BroadcastStatus bit is set to zero), the UE initiates transmission of SI request. The procedure for SI request transmission is as follows.

1. If SI request configuration is signaled by gNB for SUL (310), and criteria to select SUL is met (i.e. RSRP derived from SSB measurements of camped or serving cell <rsrp-ThresholdSSB-SUL, where rsrp-ThresholdSSB-SUL is signaled by gNB (e.g. in broadcast signaling such as SIB1)) (320):

UE initiate transmission of SI request based on Msg1 based SI request on SUL (330). In other words, UE initiates Random Access procedure using the PRACH preamble(s) and PRACH resource(s) in SI request configuration of SUL. UE transmits Msg1 (i.e. Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

2. Else if SI request configuration is signaled by gNB for NUL (340) and criteria to select NUL is met (i.e. NUL is selected if SUL is supported in camped or serving cell and RSRP derived from SSB measurements of camped or serving cell >=rsrp-ThresholdSSB-SUL; OR NUL is selected if SUL is not supported in serving cell):

UE initiate transmission of SI request based on Msg1 based SI request on NUL (350). In other words, UE initiates Random Access procedure using the PRACH preamble(s) and PRACH resource(s) in SI request configuration of NUL. UE transmits Msg1 (i.e. Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

3. Else UE initiate transmission of SI request based on Msg3 based SI request. In other words, UE initiate transmission of RRCSystemInfoRequest message (345).

UE transmits Msg1 (i.e. Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

Note that if SUL is configured, UL carrier for Msg1 transmission will be selected by UE in similar manner as selected by UE for Msg1 based SI request.

SUL is the selected UL carrier, if RSRP derived from SSB measurements of camped or serving cell <rsrp-ThresholdSSB-SUL where rsrp-ThresholdSSB-SUL is signaled by gNB (e.g. in broadcast signaling such as SIB1).

NUL is the selected UL carrier, if RSRP derived from SSB measurements of camped or serving cell >=rsrp-ThresholdSSB-SUL where rsrp-ThresholdSSB-SUL is signaled by gNB (e.g. in broadcast signaling such as SIB1).

In one embodiment of the above method, RSRP derived from SSB measurements of camped or serving cell is determined as follows:

1> if nrofSS-BlocksToAverage is not configured in camped or serving cell; or
1> if absThreshSS-BlocksConsolidation is not configured in camped or serving cell; or
1> if the SS-RSRP of SSB with highest SS-RSRP is below or equal to absThreshSS-BlocksConsolidation:
2> RSRP is the SS-RSRP of SSB with highest SS-RSRP.
1> else:
2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation are signaled by gNB (e.g., in broadcast signaling such as SIB).

In an embodiment of the above method, RSRP derived from SSB measurements of camped or serving cell may be determined as follows: RSRP is the SS-RSRP of SSB with highest SS-RSRP.

Embodiment 1-4

Figure 4:
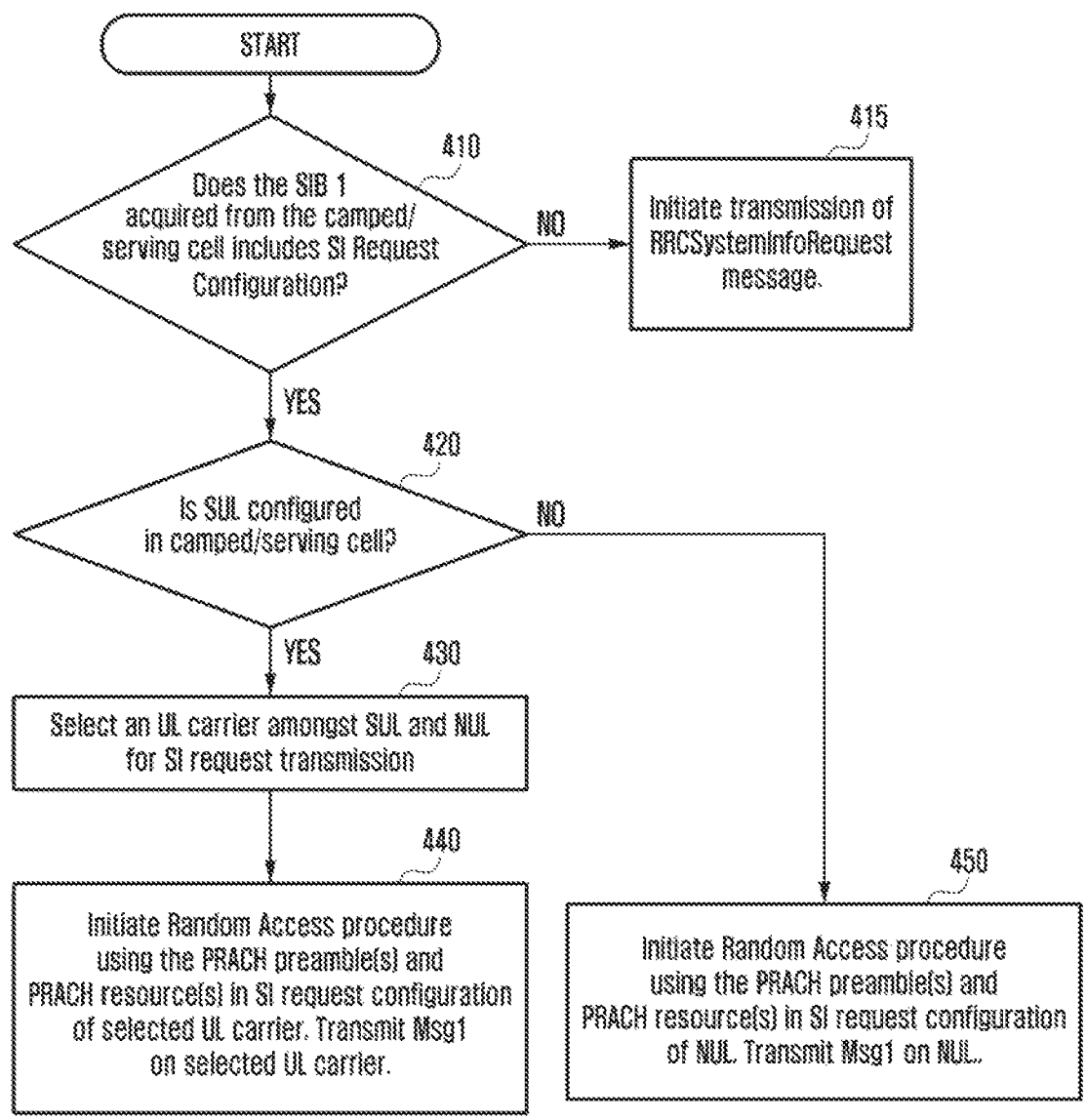
FIG. 4 illustrates a flowchart of a method of an SI request transmission procedure of a terminal and a base station according to an embodiment of the disclosure.

FIG. 4 illustrates a flowchart of a method of an SI request transmission procedure of a terminal and a base station according to an embodiment of the disclosure.

In this embodiment, if SUL is configured in serving cell, the SI request configuration is configured for SUL if the SI request configuration is configured for NUL. In accordance with the embodiment of FIG. 4, the UE operation is as follows.

The UE acquires SIB 1 from a camped or a serving cell. The UE may check the BroadcastStatus bit in SIB 1 for SI message the UE needs to acquire.

If the SI message the UE needs to acquire is not being broadcasted (i.e., BroadcastStatus bit is set to zero), the UE initiates transmission of SI request. The procedure for the SI request transmission is as follows.

1. UE determines whether SIB1 acquired from camped or serving cell includes SI request configuration or not (410).
2. If SI request configuration is not included:
UE initiate transmission of SI request based on Msg3 based SI request. In other words, UE initiate transmission of RRCSystemInfoRequest message (415).
UE transmits Msg1 (i.e. Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

Note that if SUL is configured, UL carrier for Msg1 transmission will be selected by UE in similar manner as selected by UE for Msg1 based SI request.

SUL is the selected UL carrier, if RSRP derived from SSB measurements of camped or serving cell <rsrp-ThresholdSSB-SUL where rsrp-ThresholdSSB-SUL is signaled by gNB (e.g. in broadcast signaling such as SIB1).

NUL is the selected UL carrier, if RSRP derived from SSB measurements of camped or serving cell >=rsrp-ThresholdSSB-SUL where rsrp-ThresholdSSB-SUL is signaled by gNB (e.g. in broadcast signaling such as SIB1).

3. If SI request configuration is included, UE determines whether supplementary uplink carrier (SUL) is configured or not in camped or serving cell (420, 430). If the acquired SIB1 includes common uplink configuration for SUL, SUL is determined to be configured in serving cell. Common uplink configuration for SUL is indicated by supplementaryUplink field in ServingCellConfigCommonSIB information element of SIB1. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB.

If SUL is configured in camped or serving cell:
UE selects an UL carrier amongst uplink carrier (NUL) and SUL for SI request transmission (430).
SUL is the selected UL carrier for SI request, if RSRP derived from SSB measurements of camped or serving cell <rsrp-ThresholdSSB-SUL where rsrp-ThresholdSSB-SUL is signaled by gNB (e.g. in broadcast signaling such as SIB1).
NUL is the selected UL carrier for SI request, if RSRP derived from SSB measurements of camped or serving cell >=rsrp-ThresholdSSB-SUL where rsrp-ThresholdSSB-SUL is signaled by gNB (e.g. in broadcast signaling such as SIB 1).
UE initiate transmission of SI request based on Msg1 based SI request on selected UL carrier (440). In other words, UE initiates Random Access procedure using the PRACH preamble(s) and PRACH resource(s) in SI request configuration of selected UL carrier. UE transmits Msg1 (i.e. Random access preamble) and waits for acknowledgement for SI request. Random access resources (PRACH preamble(s) and PRACH occasions(s)) indicated in SI request configuration is used for Msg1. Msg1 is transmitted on selected UL carrier. If acknowledgement for SI request is received, UE monitors the SI window of the requested SI message in one or more SI period(s) of that SI message.

Else if SUL is not configured in camped or serving cell:
UE initiate transmission of SI request based on Msg1 based SI request on NUL. In other words, UE initiates Random Access procedure using the PRACH preamble(s) and PRACH resource(s) in SI request configuration for NUL.

UE transmits Msg1 (i.e. Random access preamble) and waits for acknowledgement for SI request (450). Random access resources (PRACH preamble(s) and PRACH occasions(s)) indicated in SI request configuration is used for Msg1. Msg1 is transmitted on NUL. If acknowledgement for SI request is received, UE monitors the SI window of the requested SI message in one or more SI period(s) of that SI message.

In one embodiment of the above method, RSRP derived from SSB measurements of camped or serving cell is determined as follows:

1> if nrofSS-BlocksToAverage is not configured in camped or serving cell; or

1> if absThreshSS-BlocksConsolidation is not configured in camped or serving cell; or 1> if the SS-RSRP of SSB with highest SS-RSRP is below or equal to absThreshSS-BlocksConsolidation:

2> RSRP is the SS-RSRP of SSB with highest SS-RSRP.

1> else:

2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation may be signaled by gNB (e.g. in broadcast signaling such as SIB).

In another embodiment of the method, RSRP derived from SSB measurements of camped or serving cell may be determined as follows: RSRP is the SS-RSRP of SSB with highest SS-RSRP.

Embodiment 1-5

Figure 5:
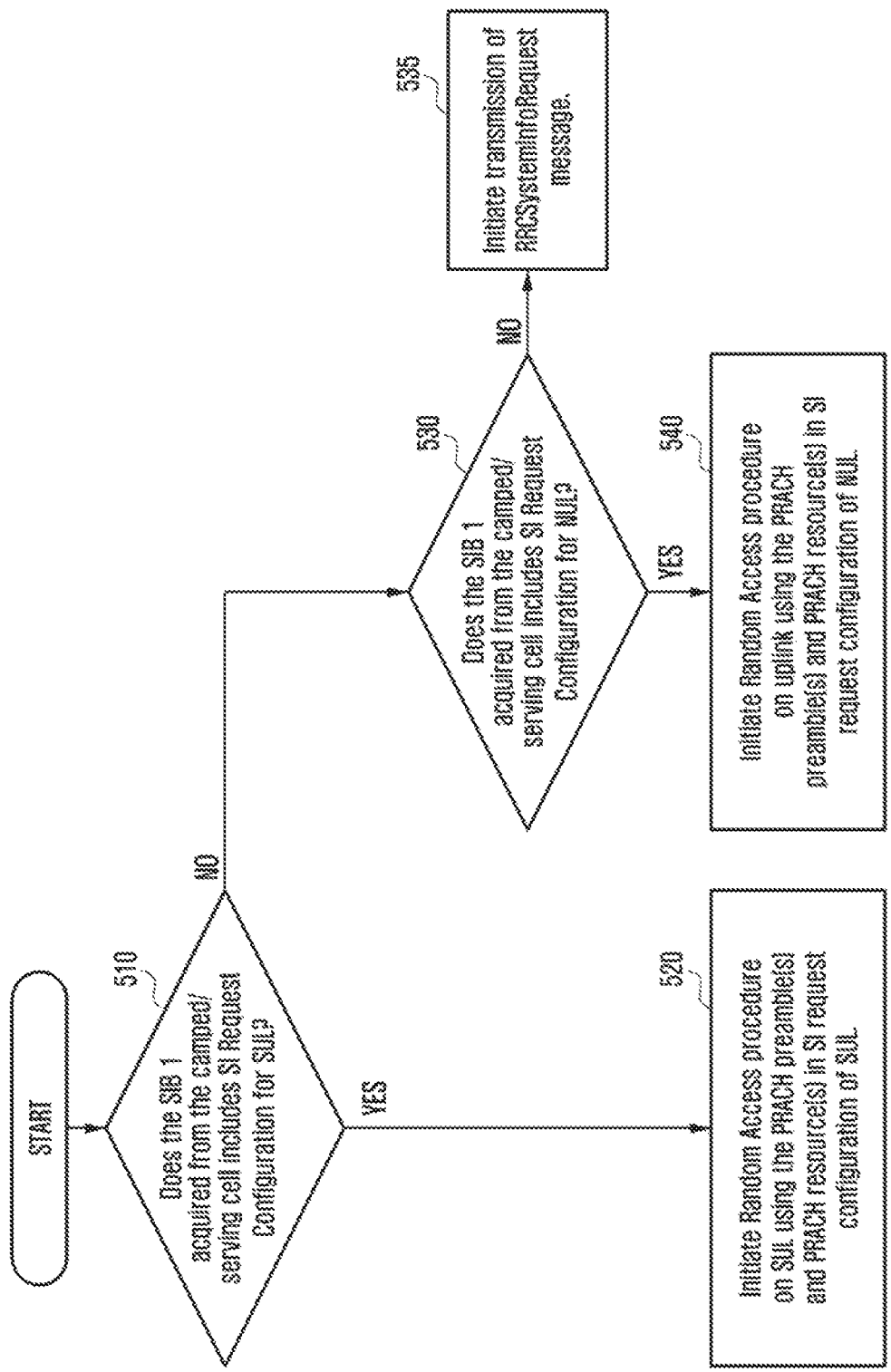
FIG. 5 illustrates a flowchart of a method of an SI request transmission procedure of a terminal and a base station according to an embodiment of the disclosure.

FIG. 5 illustrates a flowchart of a method of an SI request transmission procedure of a terminal and a base station according to another embodiment of the disclosure.

In this embodiment, SUL is prioritized over NUL, if SI request configuration is provided for both SUL and NUL. In accordance with an embodiment of FIG. 5, the UE operation is as follows.

The UE acquires SIB 1 from the camped or serving cell. The UE may check the BroadcastStatus bit in SIB 1 for SI message the UE needs to acquire.

If the SI message the UE needs to acquire is not being broadcasted (i.e., BroadcastStatus bit is set to zero), the UE initiates transmission of SI request. The procedure for SI request transmission is as follows.

1. If SI request configuration for SUL is included in acquired SIB1 (510):

UE initiate transmission of SI request based on Msg1 based SI request on SUL (520). In other words, UE initiates Random Access procedure using the PRACH preamble(s) and PRACH resource(s) in SI request configuration of SUL. UE transmits Msg1 (i.e. Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

2. Else if SI request configuration for NUL is included in acquired SIB1 (530):

UE initiate transmission of SI request based on Msg1 based SI request on NUL (540). In other words, UE initiates Random Access procedure using the PRACH preamble(s) and PRACH resource(s) in SI request configuration of NUL. UE transmits Msg1 (i.e. Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

3. Else UE initiate transmission of SI request based on Msg3 based SI request. In other words, UE initiate transmission of RRCSystemInfoRequest message (535).

UE transmits Msg1 (i.e. Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

Note that if SUL is configured, UL carrier for Msg1 transmission will be selected by UE. UL carrier selected for SI request is SUL, if RSRP derived from SSB measurements of camped or serving cell <rsrp-ThresholdSSB-SUL where rsrp-ThresholdSSB-SUL is signaled by gNB (e.g. in broadcast signaling such as SIB1). UL carrier selected for SI request is NUL, if RSRP derived from SSB measurements of camped or serving cell >=rsrp-ThresholdSSB-SUL where rsrp-ThresholdSSB-SUL is signaled by gNB (e.g. in broadcast signaling such as SIB1).

In one embodiment of the above method, RSRP derived from SSB measurements of camped or serving cell is determined as follows:

1> if nrofSS-BlocksToAverage is not configured in camped or serving cell; or

1> if absThreshSS-BlocksConsolidation is not configured in camped or serving cell; or 1> if the SS-RSRP of SSB with highest SS-RSRP is below or equal to absThreshSS-BlocksConsolidation:

2> RSRP is the SS-RSRP of SSB with highest SS-RSRP.

1> else:

2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation may be signaled by gNB (e.g., in broadcast signaling such as SIB).

In another embodiment of the method, RSRP derived from SSB measurements of camped or serving cell is determined as follows: RSRP is the SS-RSRP of SSB with highest SS-RSRP.

Embodiment 1-6

In accordance with an embodiment, the UE operation is as follows.

The UE acquires SIB 1 from the camped or serving cell. The UE may check the BroadcastStatus bit in SIB 1 for SI message the UE needs to acquire.

If the SI message the UE needs to acquire is not being broadcasted (i.e., BroadcastStatus bit is set to zero), the UE initiates transmission of SI request. The procedure for SI request transmission is as follows.

1. If SI request configuration for SUL is included in acquired SIB1 and SI request configuration for NUL is not included in acquired SIB1:

UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e. Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

2. Else if SI request configuration for SUL is included in acquired SIB1 and SI request configuration for NUL is included in acquired SIB1:

If RSRP derived from SSB measurements of camped or serving cell <rsrp-ThresholdSSB-SUL, where rsrp-ThresholdSSB-SUL is signaled by gNB (e.g. in broadcast signaling such as SIB1):

UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e. Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else,

UE initiate transmission of SI request based on Msg1 based SI request on NUL. In other words, UE initiates Random Access procedure using the PRACH preamble(s) and PRACH resource(s) in SI request configuration of NUL. UE transmits Msg1 (i.e. Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

3. Else UE initiate transmission of SI request based on Msg3 based SI request. In other words, UE initiate transmission of RRCSystemInfoRequest message.

UE transmits Msg1 (i.e. Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message.

Note that if SUL is configured, UL carrier for Msg1 transmission will be selected by UE. UL carrier selected for SI request is SUL, if RSRP derived from SSB measurements of camped or serving cell <rsrp-ThresholdSSB-SUL where rsrp-ThresholdSSB-SUL is signaled by gNB (e.g. in broadcast signaling such as SIB1). UL carrier selected for SI request is NUL, if RSRP derived from SSB measurements of camped or serving cell >=rsrp-ThresholdSSB-SUL where rsrp-ThresholdSSB-SUL is signaled by gNB (e.g. in broadcast signaling such as SIB1).

In one embodiment of the above method, RSRP derived from SSB measurements of camped or serving cell is determined as follows:

1> if nrofSS-BlocksToAverage is not configured in camped or serving cell; or

1> if absThreshSS-BlocksConsolidation is not configured in camped or serving cell; or 1> if the SS-RSRP of SSB with highest SS-RSRP is below or equal to absThreshSS-BlocksConsolidation:

2> RSRP is the SS-RSRP of SSB with highest SS-RSRP.

1> else:

2> RSRP is the linear power scale average of the SS-RSRP of SSB(s) above absThreshSS-BlocksConsolidation, where the total number of averaged SSBs shall not exceed nrofSS-BlocksToAverage.

The parameters nrofSS-BlocksToAverage and absThreshSS-BlocksConsolidation may be signaled by gNB (e.g., in broadcast signaling such as SIB).

In another embodiment of the method, RSRP derived from SSB measurements of camped or serving cell is determined as follows: RSRP is the SS-RSRP of SSB with highest SS-RSRP.

Embodiment 2—Beam Failure Recovery and C-DRX

Figure 6:
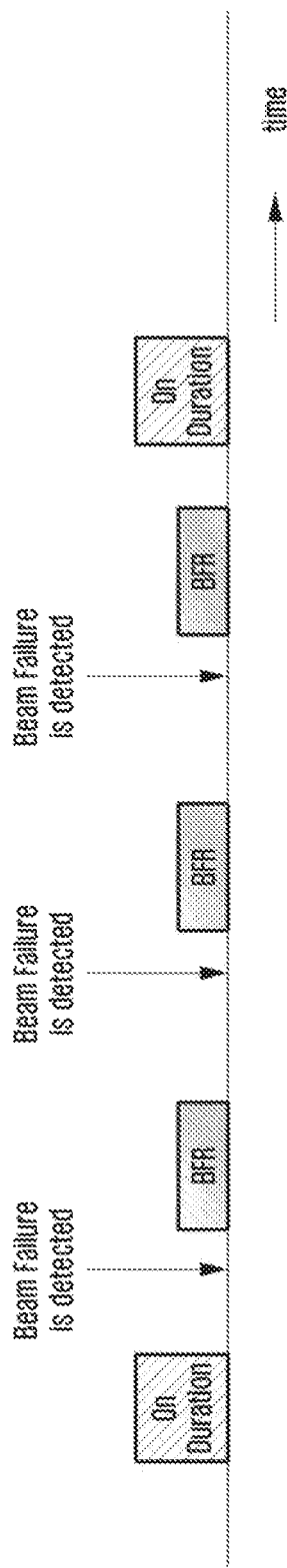
FIG. 6 illustrates a beam failure recovery procedure of a terminal and a base station according to an embodiment of the disclosure.

FIG. 6 illustrates a beam failure recovery procedure of a terminal and a base station according to an embodiment of the disclosure.

In view of the current frequency distribution policy, a band in which a broadband communication of 1 GHz or more is possible is limited and a practically selectable frequency band is only the millimeter wave band of 28 GHz or more. The signal transmitted on the high frequency band suffers from huge path losses and propagation losses compared to a signal transmitted on a frequency band of 2 GHz or lower used by conventional cellular systems. This significantly reduces the coverage of a base station using the same power as the conventional cellular systems.

Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end.

In general, the TX beamforming increases directivity by allowing an area in which propagation reaches to be densely located in a specific direction by using a plurality of antennas. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam.

A wireless communication system operating at high frequency uses a plurality of narrow TX beams to transmit signals in the cell as each narrow TX beam provides coverage to a part of cell. The more narrow the TX beam, the a higher is the antenna gain and hence the larger the propagation distance of signal transmitted using beamforming. A receiver can also make plurality of RX beam patterns of different directions. Each of these receive patterns can be also referred as RX beam.

For data communication, the gNB should transmit using the TX beam (amongst the plurality of TX beams), signal from which can be received by UE. For beam failure detection, the gNB configures the UE with beam failure detection reference signals and the UE declares beam failure when the number of beam failure instance indications from the physical layer reaches a configured threshold within a configured period. The beam failure recovery request procedure is used for indicating to the serving gNB of a new SSB or CSI-RS when beam failure is detected on the serving SSB(s)/CSI-RS(s). Beam failure is detected by the lower layers and indicated to the MAC entity. A procedure for beam failure recovery by the UE is defined as follows.

1> if beam failure indication has been received from lower layers (i.e. Physical layer):
  2> start or restart the beamFailureRecoveryTimer;
  2> increment BFI_COUNTER by 1;
  2> if BFI_COUNTER >=beamFailureInstanceMaxCount:
    3> if beamFailureRecoveryConfig is configured for the active UL BWP:
      4> start the beamFailureRecoveryTimer, if configured;
      4> initiate a Random Access procedure on the SpCell by applying the parameters powerRampingStep, preambleReceivedTargetPower, and preambleTransMax configured in beamFailureRecoveryConfig.
    3> else:
      4> initiate a Random Access procedure on the SpCell;
1> if the beamFailureRecoveryTimer expires; or
1> if beamFailureDetectionTimer, beamFailureInstanceMaxCount, or any of the reference signals used for beam failure detection is reconfigured by upper layers:
  2> set BFI_COUNTER to 0;
1> if the Random Access procedure initiated for beam failure recovery is successfully completed:
  3> stop the beamFailureRecoveryTimer, if configured;
  3> set BFI_COUNTER to 0;
  3> consider the Beam Failure Recovery Request procedure successfully completed;

According to current procedure, upon beam failure detection (i.e., when BFI_COUNTER>=beamFailureInstanceMaxCount), the UE immediately initiates the random access procedure for beam failure recovery. In the RRC Connected state, the UE can be configured with C-DRX. If DRX (discontinuous reception) is configured, the MAC entity monitors the PDCCH discontinuously using the DRX operation. During the off duration (i.e., when the UE is not monitoring PDCCH) of DRX cycle, beam failure may be detected several times as shown in FIG. 6. Performing the beam failure recovery procedure for every beam failure detection during in-active time may severely drain the UE's battery.

Embodiment 2-1

Figure 7:
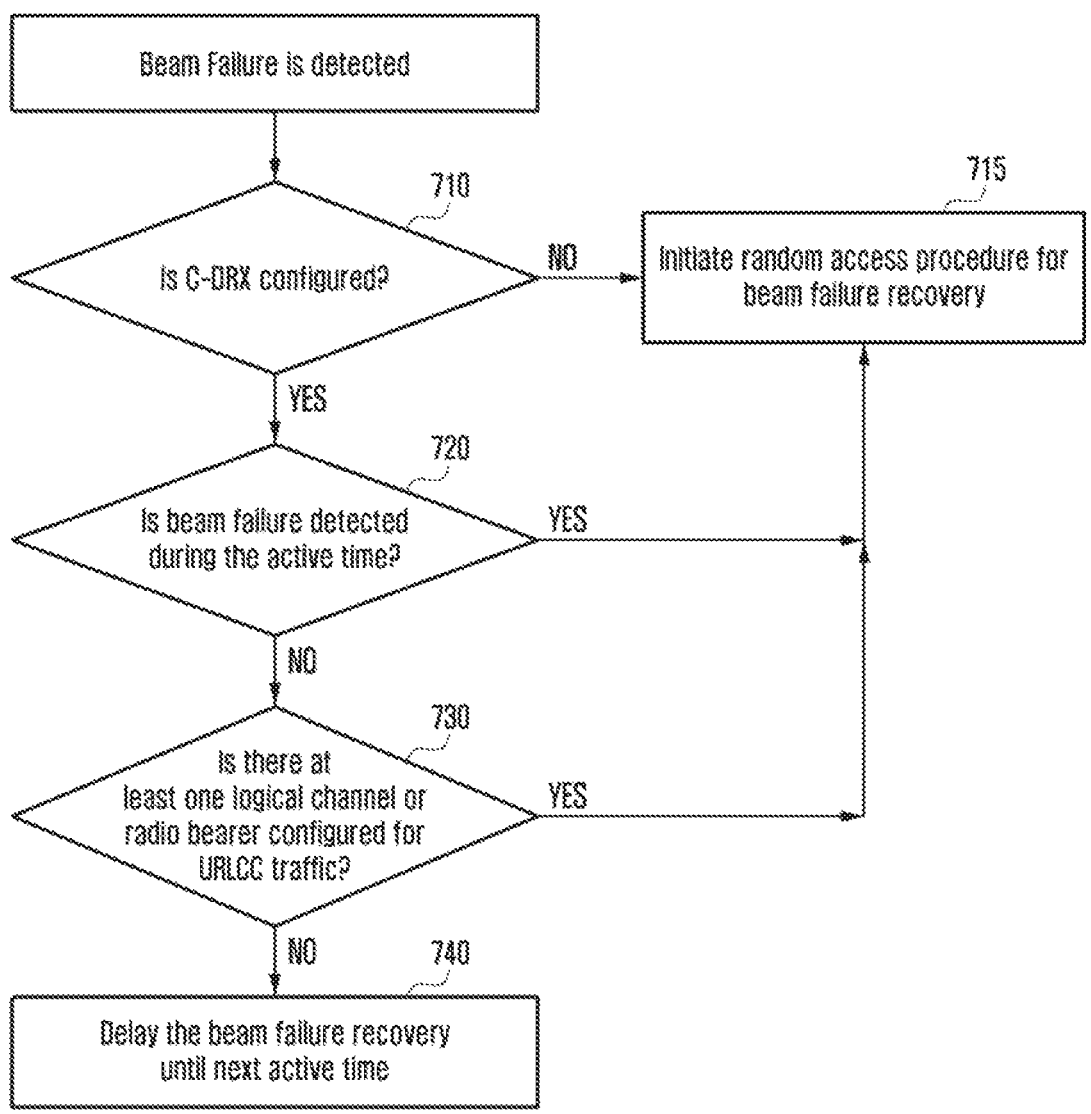
FIG. 7 illustrates a flowchart of a method of a beam failure recovery procedure of a terminal and a base station according to an embodiment of the disclosure.

FIG. 7 illustrates a flowchart of a method of a beam failure recovery procedure of a terminal and a base station according to an embodiment of the disclosure. In accordance with embodiments of FIG. 7, if C-DRX is configured and UE detects beam failure during the inactive time (710, 720), the following procedures are performed.

If UE has at least one logical channel configured for URLLC traffic (730):
  UE performs Beam Failure Recovery (BFR) upon Beam Failure Detection (BFD) (715).
Else (730)
  In one embodiment UE delays the BFR until the next active time (740). That is, UE waits for next active time to perform the BFR, instead of performing the BFR immediately.
  In another embodiment UE delays the BFR until the next active time if contention free random access resources are configured for BFR.
  In an alternate embodiment, UE delays the BFR for time 'T', if T>0, where T=T2−T1, T2=time until the next configured UL/DL grant from the time beam failure was detected; T1=time needed for BFR procedure; Otherwise, UE performs BFR upon BFD. In an embodiment, T2 is the time until next on duration.
  In an alternate embodiment, UE delays the BFR for time 'T', if T>0 and if contention free random access resources are configured for BFR; where T=T2−T1, T2=time until the next configured UL/DL grant from the time beam failure was detected; T1=time needed for BFR procedure; Otherwise, UE performs BFR upon BFD. In an embodiment, T2 is the time until next on duration.
  In an alternate embodiment, UE delays the BFR for time 'T' if T>0, where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.
  In an alternate embodiment, UE delays the BFR for time 'T', if T>0 and if contention free random access resources are configured for BFR; where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.

In the above operation logical channel or radio bearer configured for URLCC traffic can be determined as follows.

In one embodiment, a logical channel or a radio bearer mapped to one or more quality of service (QoS) flow identifiers (QFIs) from a set of QFIs is considered to be mapped to URLCC traffic. The set of QFIs can be pre-defined or signaled by gNB to UE. The set of QFIs may include one or more QFIs.

In another embodiment, a logical channel or a radio bearer mapped to specific subcarrier spacing (SCS) or a SCS from set of SCSs is considered to be mapped to URLCC traffic. The set of SCSs can be pre-defined or signaled by gNB to UE. The set of SCSs may include one or more SCSs.

In another embodiment, a logical channel or a radio bearer mapped to SCS greater than a specified SCS index is considered to be mapped to URLCC traffic. The specified SCS index can be pre-defined or signaled by gNB to UE.

In another embodiment, a logical channel or a radio bearer mapped to a logical channel priority from set of logical channel priorities is considered to be mapped to URLCC traffic. The set of logical channel priorities can be pre-defined or signaled by gNB to UE. The set of logical channel priorities may include one or more logical channel priority.

In another embodiment, a logical channel or a radio bearer mapped to a logical channel priority greater than a specified logical channel priority is considered to be mapped to URLCC traffic. The specified logical channel priority can be pre-defined or signaled by gNB to UE.

In another embodiment, a logical channel or a radio bearer mapped to physical downlink shared channel (PDSCH) duration smaller than a specified PDSCH duration is considered to be mapped to URLCC traffic. The specified PDSCH duration can be pre-defined or signaled by gNB to UE.

In another embodiment, a logical channel or a radio bearer mapped to a specified PDSCH duration is considered to be mapped to URLCC traffic. The specified PDSCH duration can be pre-defined or signaled by gNB to UE.

Embodiment 2-2

Figure 8:
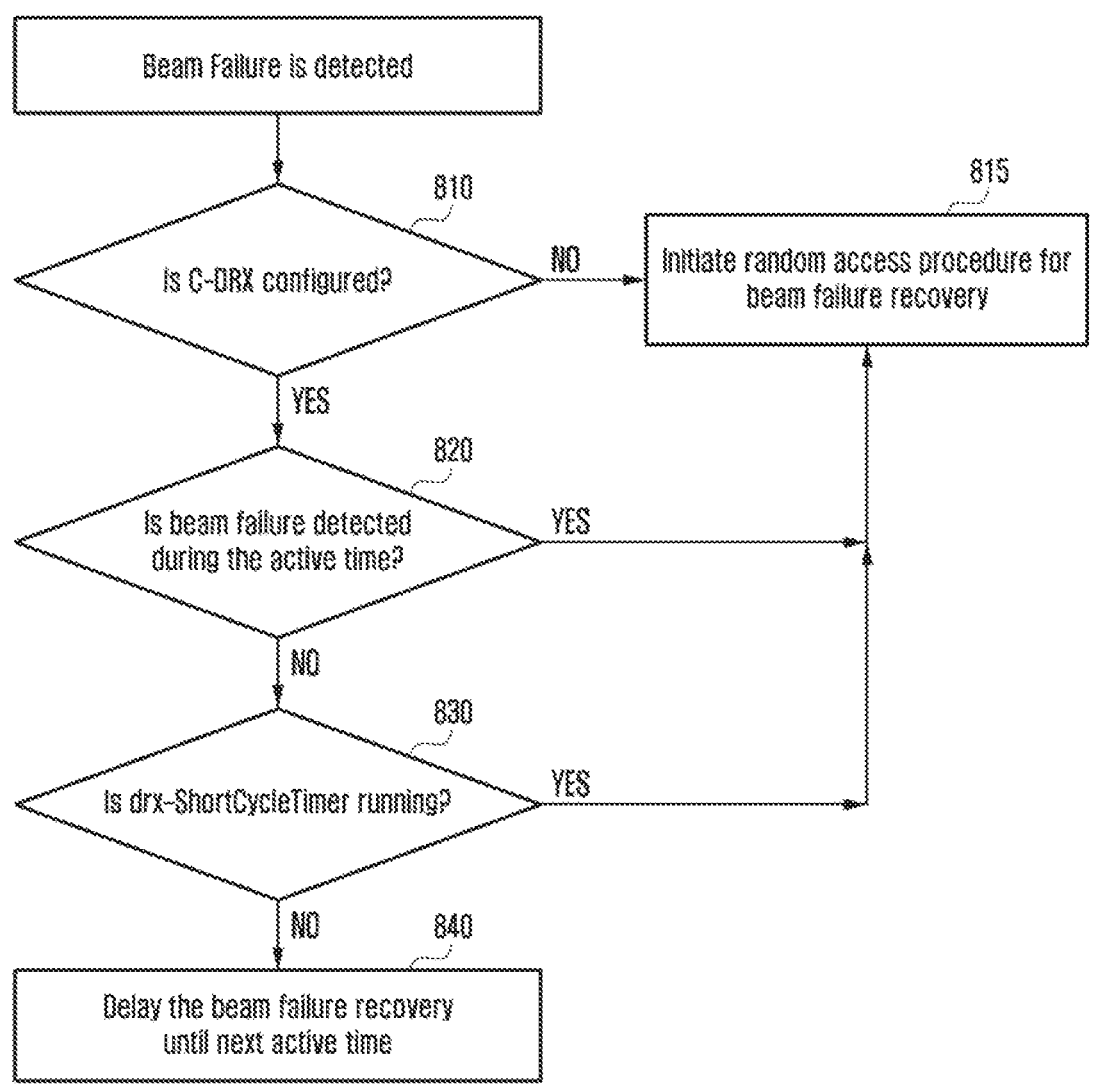
FIG. 8 illustrates a flowchart of a method of a beam failure recovery procedure of a terminal and a base station according to an embodiment of the disclosure.

FIG. 8 illustrates a flowchart of a method of a beam failure recovery procedure of a terminal and a base station according to an embodiment of the disclosure.

In accordance with an embodiment of FIG. 8, if C-DRX is configured and UE detects beam failure during the inactive time (810, 820), the following is performed.
  If drx-ShortCycleTimer is running (830),
  UE performs BFR upon BFD (815).
  Else (830)—In one embodiment UE delays the BFR until the next active time (840).
    In another embodiment UE delays the BFR until the next active time if contention free random access resources are configured for BFR.
    In an alternate embodiment, UE delays the BFR for time 'T', if T>0, where T=T2−T1, T2=time until the next configured UL/DL grant from the time beam failure was detected; T1=time needed for BFR procedure; Otherwise, UE performs BFR upon BFD. In an embodiment, T2 is the time until next on duration.
    In an alternate embodiment, UE delays the BFR for time 'T', if T>0 and if contention free random access resources are configured for BFR; where T=T2−T1, T2=time until the next configured UL/DL grant from the time beam failure was detected; T1=time needed for BFR procedure; Otherwise, UE performs BFR upon BFD. In an embodiment, T2 is the time until next on duration.
    In an alternate embodiment, UE delays the BFR for time 'T' if T>0, where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.
    In an alternate embodiment, UE delays the BFR for time 'T', if T>0 and if contention free random access resources are configured for BFR; where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.

As a result, BFR may be delayed during inactive time of long DRX cycle.

Embodiment 2-3

Figure 9:
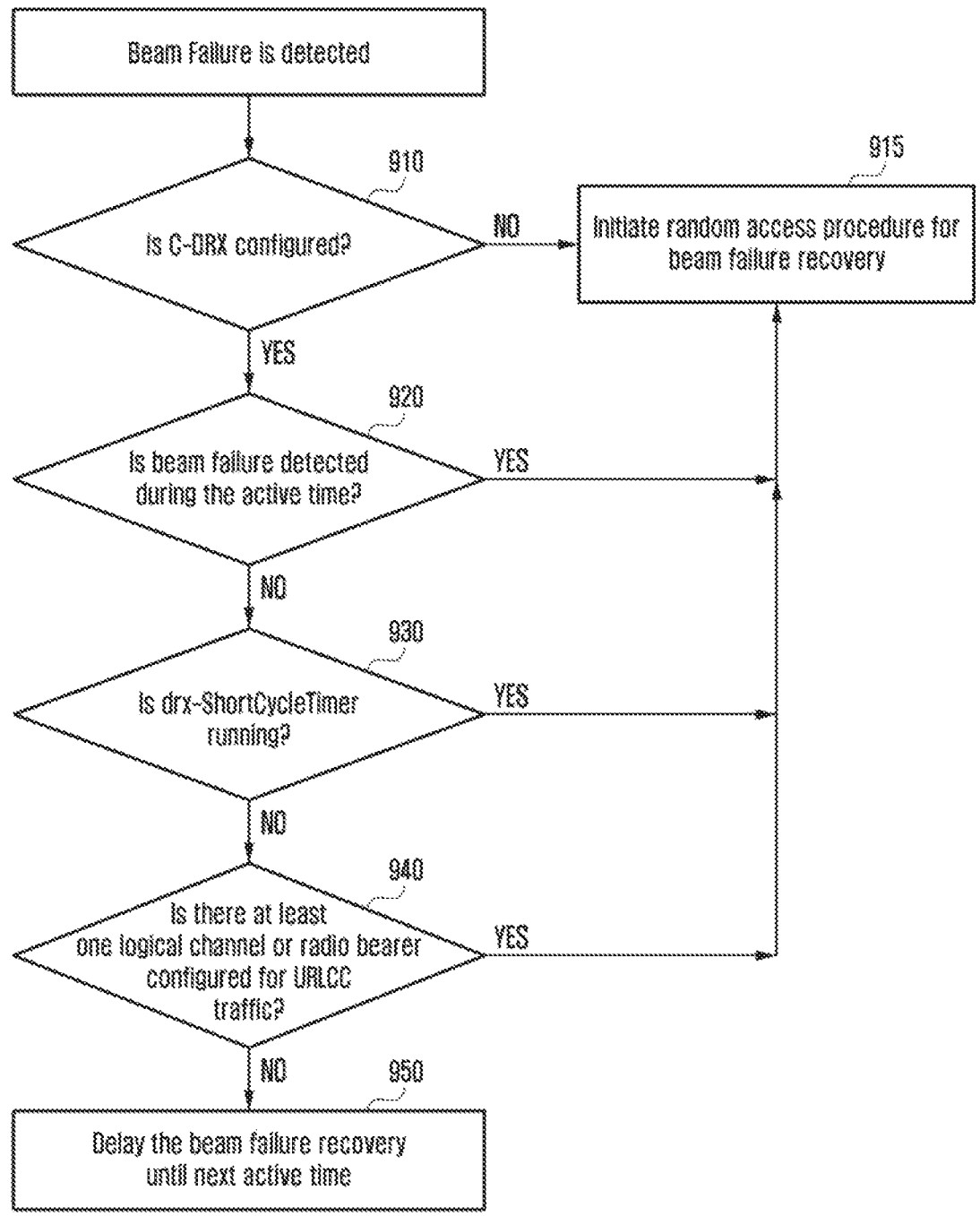
FIG. 9 illustrates a flowchart of a method of a beam failure recovery procedure of a terminal and a base station according to an embodiment of the disclosure.

FIG. 9 illustrates a flowchart of a method of a beam failure recovery procedure of a terminal and a base station according to an embodiment of the disclosure.

In accordance with an embodiment of FIG. 9, if C-DRX is configured and UE detects beam failure during the inactive time (910, 920), the following is performed.
  If drx-ShortCycleTimer is running and/or if UE has at least one logical channel configured for URLLC traffic (930, 940):
    UE performs BFR upon BFD (915).
  Else (930, 940)
    In one embodiment UE delays the BFR until the next active time (950).
    In another embodiment UE delays the BFR until the next active time if contention free random access resources are configured for BFR.
    In an alternate embodiment, UE delays the BFR for time 'T', if T>0, where T=T2−T1, T2=time until the next configured UL/DL grant from the time beam failure was detected; T1=time needed for BFR procedure; Otherwise, UE performs BFR upon BFD. In an embodiment, T2 is the time until next on duration.
    In an alternate embodiment, UE delays the BFR for time 'T', if T>0 and if contention free random access resources are configured for BFR; where T=T2−T1, T2=time until the next configured UL/DL grant from the time beam failure was detected; T1=time needed for BFR procedure; Otherwise, UE performs BFR upon BFD. In an embodiment, T2 is the time until next on duration.
    In an alternate embodiment, UE delays the BFR for time 'T' if T>0, where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.
    In an alternate embodiment, UE delays the BFR for time 'T', if T>0 and if contention free random access resources are configured for BFR; where T=T2−T1, T2=time until the next configured UL/DL grant from the time beam failure was detected; T1=pre-defined or signaled by gNB; Otherwise, UE performs BFR upon BFD. In an embodiment, T2 is the time until next on duration.

In the above operation logical channel or radio bearer configured for URLCC traffic can be determined as follows.

In one embodiment, a logical channel or a radio bearer mapped to one or more QFIs from a set of QFIs is considered to be mapped to URLCC traffic. The set of QFIs can be pre-defined or signaled by gNB to UE. The set of QFIs may include one or more QFIs.

In another embodiment, a logical channel or a radio bearer mapped to specific SCS or a SCS from set of SCSs is considered to be mapped to URLCC traffic. The set of SCSs can be pre-defined or signaled by gNB to UE. The set of SCSs may include one or more SCSs.

In another embodiment, a logical channel or a radio bearer mapped to SCS greater than a specified SCS index is considered to be mapped to URLCC traffic. The specified SCS index can be pre-defined or signaled by gNB to UE.

In another embodiment, a logical channel or a radio bearer mapped to a logical channel priority from set of logical channel priorities is considered to be mapped to URLCC traffic. The set of logical channel priorities can be pre-defined or signaled by gNB to UE. The set of logical channel priorities may include one or more logical channel priority.

In another embodiment, a logical channel or a radio bearer mapped to a logical channel priority greater than a specified logical channel priority is considered to be mapped to URLCC traffic. The specified logical channel priority can be pre-defined or signaled by gNB to UE.

In another embodiment, a logical channel or a radio bearer mapped to PDSCH duration smaller than a specified PDSCH duration is considered to be mapped to URLCC traffic. The specified PDSCH duration can be pre-defined or signaled by gNB to UE.

In another embodiment, a logical channel or a radio bearer mapped to a specified PDSCH duration is considered to be mapped to URLCC traffic. The specified PDSCH duration can be pre-defined or signalled by gNB to UE.

Embodiment 2-4

Figure 10:
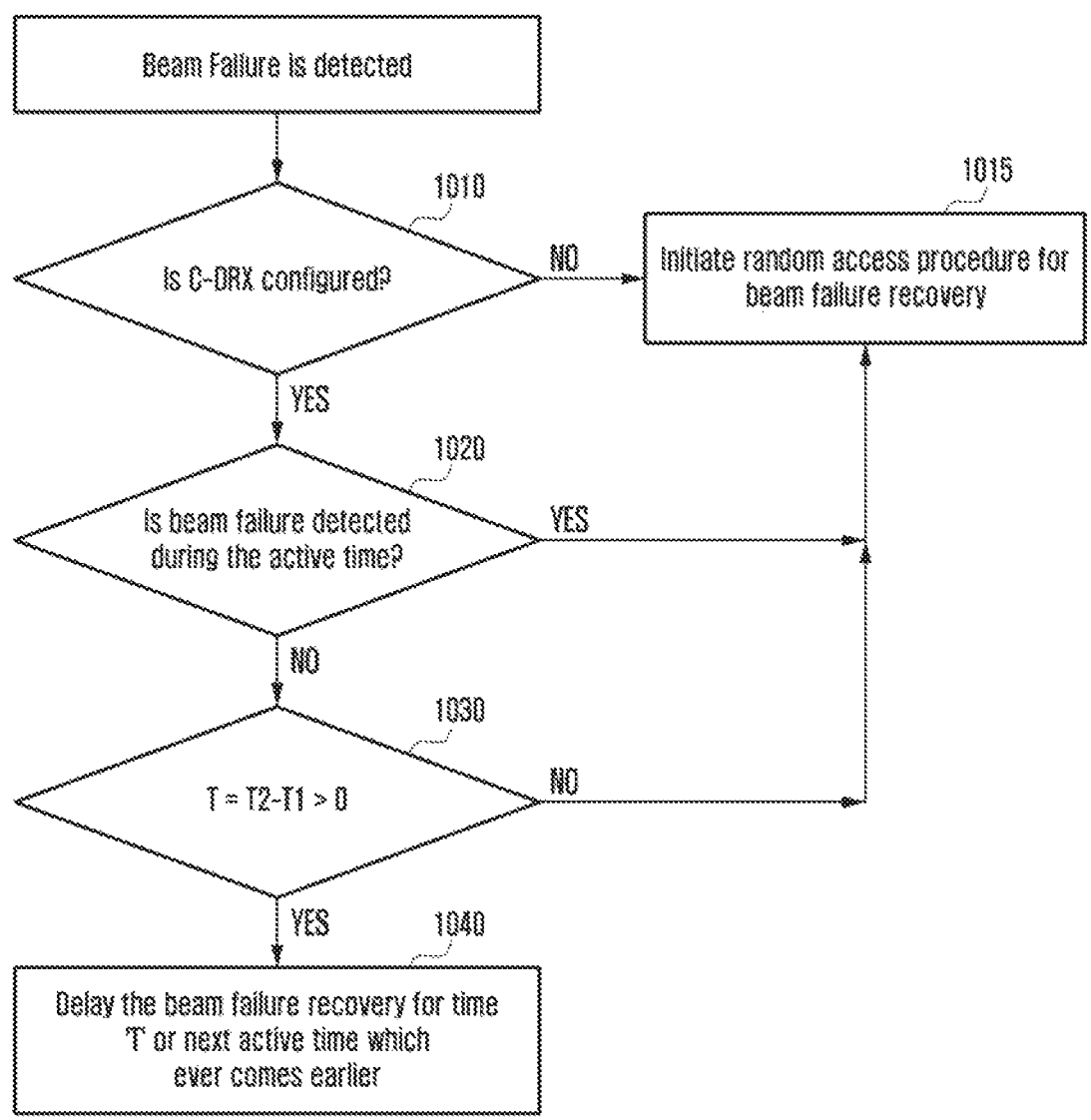
FIG. 10 illustrates a flowchart of a method of a beam failure recovery procedure of a terminal and a base station according to an embodiment of the disclosure.

FIG. 10 illustrates a flowchart of a method of a beam failure recovery procedure of a terminal and a base station according to another embodiment of the disclosure.

In accordance with an embodiment of FIG. 10, if C-DRX is configured and UE detects beam failure during the inactive time (1010, 1020), the following may be performed.
  UE delays the BFR for time 'T' or until next active time whichever comes earlier, if T>0, where T=T2−T1, T2=time until the next configured UL/DL grant from the time beam failure was detected; T1=time needed for BFR procedure (1030, 1040);
    In an embodiment T1 can be pre-defined or signaled by gNB.
    In an embodiment, T2 is the time until next on duration.
    if T<0 UE performs BFR upon BFD (1030, 1015).
  In one embodiment the above procedure is applied only when UE is in long DRX cycle.

Embodiment 2-5

Figure 11:
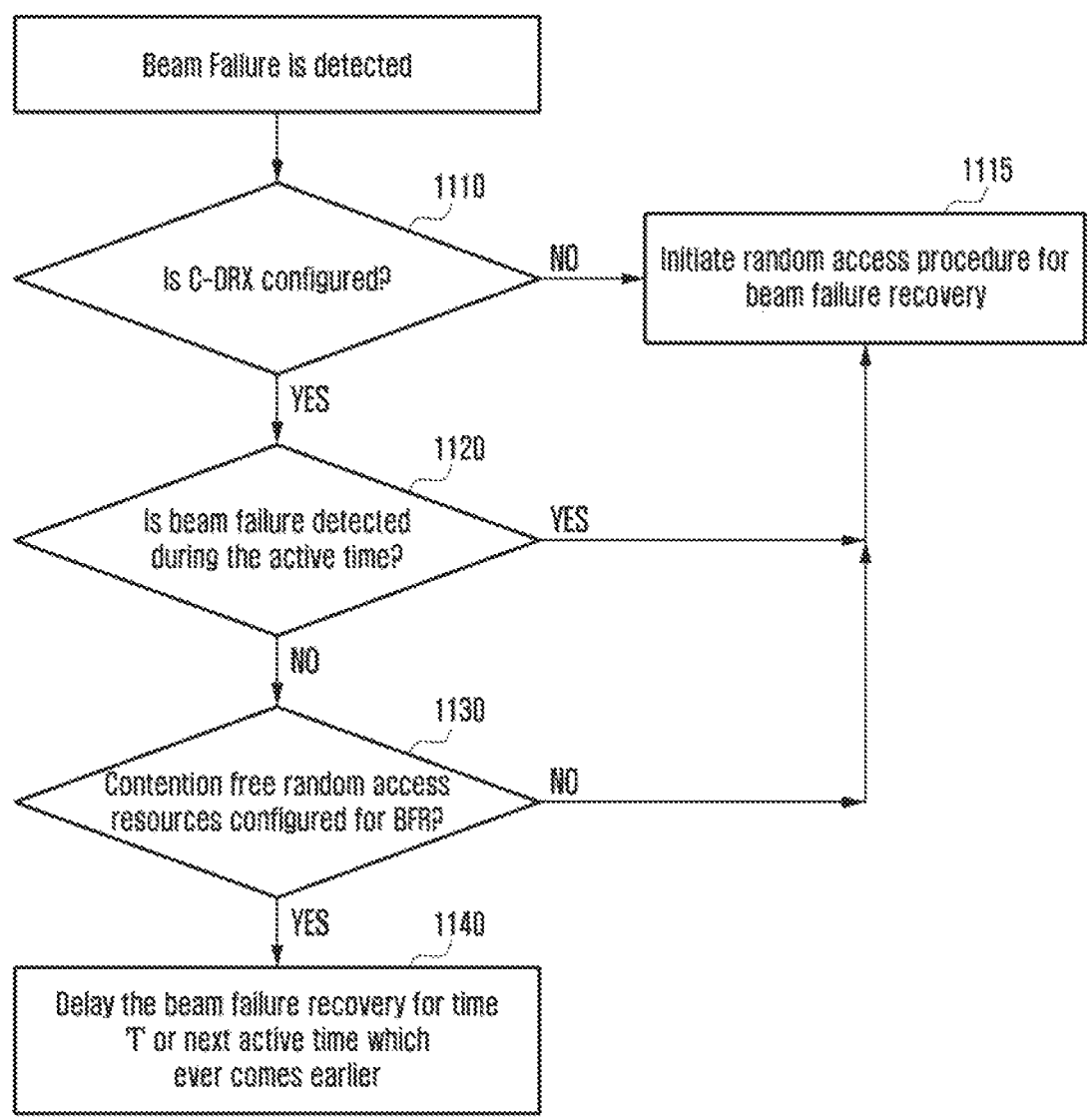
FIG. 11 illustrates a flowchart of a method of a beam failure recovery procedure of a terminal and a base station according to an embodiment of the disclosure.

FIG. 11 illustrates a beam failure recovery procedure of a terminal and a base station according to another embodiment of the disclosure.

In accordance with an embodiment of FIG. 11, it is proposed that if C-DRX is configured and UE detects beam failure during the inactive time (1110, 1120):
  UE delays the BFR if contention free random access resources are configured for BFR (1130, 1140);
  Otherwise performs BFR upon BFD (1130, 1115).
  In one embodiment the above procedure is applied only when UE is in long DRX cycle.

Figure 12:
FIG. 12 is a block diagram of a terminal according to an embodiment of the disclosure.

FIG. 12 is a block diagram of a terminal according to an embodiment of the disclosure.

Referring to FIG. 12, a terminal includes a transceiver 1210, a controller 1220 and a memory 1230. The controller 1220 may refer to a circuitry, an application-specific integrated circuit (ASIC), or at least one processor. The transceiver 1210, the controller 1220 and the memory 1230 are configured to implement the operations of the UE illustrated in FIGS. 1 to 11 described above. Although the transceiver 1210, the controller 1220 and the memory 1230 are shown as separate entities, they may be realized as a single entity like a single chip or system on chip (SoC). The transceiver 1210, the controller 1220 and the memory 1230 may be electrically connected to or coupled with each other.

The transceiver 1210 may transmit signals to and receive signals from other network entities, e.g., a base station or other UEs. The controller 1220 may control the UE to perform functions according to one or more of the embodiments described above. The controller 1220 may refer to circuitry, an ASIC, or at least one processor.

In an embodiment, the operations of the terminal may be implemented using the memory 1230 storing corresponding program codes, software programs, firmware, or other computer-executable instructions. Specifically, the terminal may be equipped with the memory 1230 to store program codes effecting the operations illustrated in FIGS. 1 to 11. To perform the operations, the controller 1220 may read, load, and execute the program codes stored in the memory 1230, for example by using a processor or a central processing unit (CPU).

Figure 13:
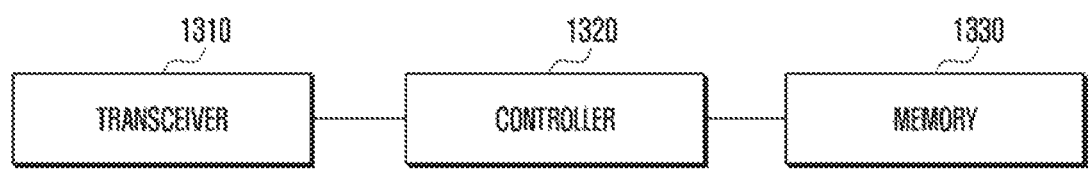
FIG. 13 is a block diagram of a base station according to an embodiment of the disclosure.

FIG. 13 is a block diagram of a base station according to an embodiment of the disclosure.

Referring to FIG. 13, a base station includes a transceiver 1310, a controller 1320 and a memory 1330. The transceiver 1310, the controller 1320 and the memory 1330 are configured to implement the operations of the network (e.g., gNB) illustrated in the figures, e.g. FIGS. 1 to 11, or described above. Although the transceiver 1310, the controller 1320 and the memory 1330 are shown as separate entities, they may be realized as a single entity like a single chip or system on chip (SoC). The transceiver 1310, the controller 1320 and the memory 1330 may be electrically connected to or coupled with each other.

The transceiver 1310 may transmit signals to and receive signals from other network entities, e.g., a terminal or other base station. The controller 1320 may control the base station to perform functions according to one of the embodiments described above. The controller 1320 may refer to a circuitry, an ASIC, or at least one processor.

In an embodiment, the operations of the base station may be implemented using the memory 1330 storing corresponding program codes, software programs, firmware, or other computer-executable instructions. Specifically, the base station may be equipped with the memory 1330 to store program codes effecting desired operations. To perform the desired operations, the controller 1320 may read, load, and execute the program codes stored in the memory 1330 by using a processor or a CPU.

While the disclosure has been shown and described with reference to various embodiments thereof, it will be understood by those skilled in the art that various changes in form and details may be made therein without departing from the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

What is claimed is:

1. A method performed by a terminal in a wireless communication system, the method comprising:
    identifying whether a system information block 1 (SIB 1) received from a base station includes a system information request configuration for a supplementary uplink (SUL) or a system information request configuration for a normal uplink (NUL);
    transmitting, on the SUL to the base station, a random access preamble to request system information based on the system information request configuration for the SUL, in a case that the SIB 1 includes the system information request configuration for the SUL and a first criteria to select the SUL is met;
    transmitting, on the NUL to the base station, the random access preamble to request the system information based on the system information request configuration for the NUL, in a case that the SIB 1 includes the system information request configuration for the NUL and a second criteria to select the NUL is met; and
    transmitting, to the base station, a radio resource control (RRC) system information request message to request the system information, in a case that the SIB 1 does not include the system information request configuration for the SUL and the SIB 1 does not include the system information request configuration for the NUL.

2. The method of claim 1, wherein the first criteria to select the SUL is identified to be met, in a case that a serving cell for the random access preamble is configured with the SUL and a reference signal received power (RSRP) of the serving cell is less than a threshold.

3. The method of claim 2, wherein the second criteria to select the NUL is identified to be met, in a case that the serving cell is not configured with the SUL or the RSRP is equal to or greater than the threshold.

4. The method of claim 1, further comprising:
    receiving, from the base station, a requested SI message based on an acknowledgement for the random access preamble or an acknowledgement for the RRC system information request message.

5. A method performed by a base station in a wireless communication system, the method comprising:
    identifying whether a system information block 1 (SIB 1) transmitted to a terminal includes a system information request configuration for a supplement uplink (SUL) or a system information request configuration for a normal uplink (NUL);
    receiving, on the SUL from the terminal, a random access preamble to request system information based on the system information request configuration for the SUL, in a case that the SIB 1 includes the system information request configuration for the SUL and a first criteria to select the SUL is met;
    receiving, on the NUL from the terminal, the random access preamble to request the system information based on the system information request configuration for the NUL, in a case that the SIB 1 includes the system information request configuration for the NUL and a second criteria to select the NUL is met; and
    receiving, from the terminal, a radio resource control (RRC) system information request message to request the system information, in a case that the SIB 1 does not include the system information request configuration for the SUL and the SIB 1 does not include the system information request configuration for the NUL.

6. The method of claim 5, wherein the first criteria to select the SUL is met, in a case that a serving cell for the random access preamble is configured with the SUL and a reference signal received power (RSRP) of the serving cell is less than a threshold.

7. The method of claim 6, wherein the second criteria to select the NUL is met, in a case that the serving cell is not configured with the SUL or the RSRP is equal to or greater than the threshold.

8. The method of claim 5, further comprising:
    transmitting, to the terminal, a requested SI message as a response to the random access preamble or the RRC system information request message.

9. A terminal in a wireless communication system, the terminal comprising:
    a transceiver configured to transmit and receive a signal; and
    a controller configured to:
    identify whether a system information block 1 (SIB 1) received from a base station includes a system information request configuration for a supplementary uplink (SUL) or a system information request configuration for a normal uplink (NUL),
    transmit, on the SUL to the base station, a random access preamble to request system information based on the system information request configuration for the SUL, in a case that the SIB 1 includes the system information request configuration for the SUL and a first criteria to select the SUL is met,
    transmit, on the NUL to the base station, the random access preamble to request the system information based on the system information request configuration for the NUL, in a case that the SIB 1 includes the system information request configuration for the NUL and a second criteria to select the NUL is met, and
    transmit, to the base station, a radio resource control (RRC) system information request message to request the system information, in a case that the SIB 1 does not include the system information request configuration for the SUL and the SIB 1 does not include the system information request configuration for the NUL.

10. The terminal of claim 9, wherein the first criteria to select the SUL is identified to be met, in a case that a serving cell for the random access preamble is configured with the SUL and a reference signal received power (RSRP) of the serving cell is less than a threshold.

11. The terminal of claim 10, wherein the second criteria to select the NUL is identified to be met, in a case that the serving cell is not configured with the SUL or the RSRP is equal to or greater than the threshold.

12. The terminal of claim 9, wherein the controller is further configured to:
    receive, from the base station a requested SI message based on an acknowledgement for the random access preamble or an acknowledgement for the RRC system information request message.

13. A base station in a wireless communication system, the base station comprising:
    a transceiver configured to transmit and receive a signal; and
    a controller configured to:
    identify whether a system information block 1 (SIB 1) transmitted to a terminal includes a system information request configuration for a supplement uplink (SUL) or a system information request configuration for a normal uplink (NUL),
    receive, on the SUL from the terminal, a random access preamble to request system information (SI) based on the system information a first SI request configuration for the SUL, in case that the SIB 1 includes the system information request configuration for the SUL and a first criteria to select the SUL is met, receive, on the NUL from the terminal, the random access preamble to request the system information based on the system information request configuration for the NUL, in a case that the SIB 1 includes the system information request configuration for the NUL and a second criteria to select the NUL is met; and receive, from the terminal, a radio resource control (RRC) system information request message to request the system information, in a case that the SIB 1 does not include the system information request configuration for the SUL and the SIB 1 does not include the system information request configuration for the NUL.

14. The base station of claim 13, wherein the first criteria to select the SUL is met, in a case that a serving cell for the random access preamble is configured with the SUL and a reference signal received power (RSRP) of the serving cell is less than a threshold.

15. The base station of claim 14, wherein the second criteria to select the NUL is met, in a case that the serving cell is not configured with the SUL or the RSRP is equal to or greater than the threshold.

16. The base station of claim 13, wherein the controller is further configured to:

transmit, to the terminal, a requested SI message as a response to the random access preamble or RRC system information request message.

* * * * *